United States Patent
Tang

(10) Patent No.: US 11,514,640 B2
(45) Date of Patent: Nov. 29, 2022

(54) IMAGE OCCLUSION PROCESSING METHOD, DEVICE, APPARATUS AND COMPUTER STORAGE MEDIUM

(71) Applicant: Tencent Technology (Shenzhen) Company Limited, Guangdong (CN)

(72) Inventor: Jiangjun Tang, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/365,703

(22) Filed: Jul. 1, 2021

(65) Prior Publication Data

US 2021/0327123 A1   Oct. 21, 2021

Related U.S. Application Data

(63) Continuation of application No. PCT/CN2020/086623, filed on Apr. 24, 2020.

(30) Foreign Application Priority Data

May 10, 2019 (CN) .......................... 201910395675.3

(51) Int. Cl.
*G06T 15/40* (2011.01)
*G06T 15/20* (2011.01)

(52) U.S. Cl.
CPC .............. *G06T 15/40* (2013.01); *G06T 15/20* (2013.01)

(58) Field of Classification Search
None
See application file for complete search history.

(56) References Cited

U.S. PATENT DOCUMENTS

| | | | |
|---|---|---|---|
| 5,926,183 A | 7/1999 | Menon et al. | |
| 6,111,582 A * | 8/2000 | Jenkins | ................... G06T 15/40 |
| | | | 345/421 |
| 2002/0128797 A1 | 9/2002 | Sun | |
| 2005/0134588 A1 | 6/2005 | Aila et al. | |
| 2008/0250465 A1 | 10/2008 | Kim et al. | |
| 2010/0303302 A1 | 12/2010 | Kipman et al. | |
| 2016/0005216 A1 | 1/2016 | Lee et al. | |
| 2020/0160546 A1* | 5/2020 | Gu | ........................... G06N 3/08 |

FOREIGN PATENT DOCUMENTS

| CN | 101278271 A | 10/2008 |
|---|---|---|
| CN | 101364265 A | 2/2009 |
| CN | 102014293 A | 4/2011 |

(Continued)

OTHER PUBLICATIONS

China Search Report for CN 201910395675.3 dated Dec. 3, 2020, 3p, in Chinese language.

(Continued)

*Primary Examiner* — Nurun Flora
(74) *Attorney, Agent, or Firm* — Crowell & Morning LLP

(57) ABSTRACT

This disclosure provides a method and apparatus for processing occlusion in an image, a device, and a computer storage medium. The method includes: determining a current viewpoint parameter used for drawing a current image frame; obtaining a predicted depth map matching the current viewpoint parameter as a target depth map of the current image frame; and determining an occlusion culling result of an object in the current image frame according to the target depth map.

20 Claims, 10 Drawing Sheets

(56) References Cited

FOREIGN PATENT DOCUMENTS

| | | |
|---|---|---|
| CN | 103500467 A | 1/2014 |
| CN | 104331918 A | 2/2015 |
| CN | 104766363 A | 7/2015 |
| CN | 106023299 A | 10/2016 |
| CN | 107274472 A | 10/2017 |
| CN | 107292965 A | 10/2017 |
| CN | 107376360 A | 11/2017 |
| CN | 107958480 | 4/2018 |
| CN | 110136082 A | 8/2019 |
| WO | WO 2020/228511 A1 | 11/2020 |

OTHER PUBLICATIONS

China Office Action issued for CN 201910395675.3 dated Dec. 11, 2020, 6p, in Chinese language.
International Search Report and Written Opinion for priority application No. PCT/CN2020/086623 dated Jul. 22, 2020, 10p, in Chinese language.
English Translation of the International Search Report for priority application No. PCT/CN2020/086623 dated Jul. 22, 2020, 2p.
Extended European Search Report for application No. EP 20805478.3 dated Sep. 9, 2022, 7p.

\* cited by examiner

|  | Hardware occlusion query | Software occlusion culling | Precomputed visible result set | Portal culling |
|---|---|---|---|---|
| Calculation speed | Quick ★★★★ | Average ★★☆☆ | Quick ★★★★ | Quick ★★★★ |
| Delay | Poor ★☆☆☆ | Good ★★★★ | Good ★★★★ | Good ★★★★ |
| Culling accuracy | High ★★★★ | Higher ★★★☆ | Low ★☆☆☆ | High ★★★★ |
| Scene adaptability | Good ★★★★ | Better ★★★☆ | Average ★★☆☆ | Poor ★☆☆☆ |

FIG. 1

000# IMAGE OCCLUSION PROCESSING METHOD, DEVICE, APPARATUS AND COMPUTER STORAGE MEDIUM

RELATED APPLICATIONS

This application is a continuation of PCT Application No. PCT/CN2020/086623, entitled "IMAGE OCCLUSION PROCESSING METHOD, DEVICE, APPARATUS AND COMPUTER STORAGE MEDIUM" and filed on Apr. 24, 2020, which claims priority to Chinese Patent Application No. 201910395675.3 filed on May 10, 2019. The above applications are incorporated herein by reference in their entireties.

TECHNICAL FIELD

This disclosure relates to the field of image drawing technologies, and in particular, to a method and apparatus for processing occlusion in an image, a device, and a computer storage medium.

BACKGROUND

Because many applications, when run, such as games and other applications adopting virtual reality (VR) technologies in a computer device use image rendering technologies, generally, to reduce rendering workload of a graphics engine and improve rendering efficiency to ensure fluent running of the applications, before an image is rendered, an object that is invisible because of occlusion in the to-be-rendered image is usually culled or removed, and only a currently visible object is rendered.

In an actual application, an entire depth map of a virtual scene is usually drawn in a software rasterization manner, to detect, according to a depth map generated under a viewing frustum for drawing a current frame of image, an occlusion relationship between objects in the current frame of image, to cull an occluded object and avoid rendering the occluded object and reducing image rendering efficiency.

SUMMARY

In view of this, embodiments of this disclosure provide a method and apparatus for processing occlusion in an image, a device, and a computer storage medium, improving efficiency of determining an occlusion relationship of objects in an image and expanding an application range of a mobile platform.

To achieve the foregoing objective, the embodiments of this disclosure provide the following technical solutions.

The embodiments of this disclosure provide a method for processing occlusion in an image, including:
  determining a current viewpoint parameter used for drawing a current image frame;
  obtaining a predicted depth map matching the current viewpoint parameter as a target depth map of the current image frame; and
  performing occlusion culling according to the target depth map, to obtain an occlusion culling result of an object in the current image frame.

The embodiments of this disclosure provide a method for processing occlusion in an image, applicable to a computer device, the computer device including one or more processors and a memory, and one or more computer programs, the one or more computer programs being stored in the memory, the computer program being capable of including one or more units each corresponding to one set of instructions, the one or more processors being configured to execute the instructions; the method including:
  determining a current viewpoint parameter used for drawing a current frame of image;
  obtaining a predicted depth map matching the current viewpoint parameter as a target depth map of the current frame of image; and
  performing occlusion culling according to the target depth map, to obtain an occlusion culling result of an object in the current frame of image.

The embodiments of this disclosure provide an apparatus for processing occlusion in an image, comprising:
  a memory storing at least one program;
  at least one processor, in communication with the memory and configured to execute the at least one program to perform the steps, comprising:
  determining a current viewpoint parameter used for drawing a current image frame;
  obtaining a predicted depth map matching the current viewpoint parameter as a target depth map of the current image frame; and
  performing occlusion culling according to the target depth map to obtain an occlusion culling result of an object in the current image frame.

The embodiments of this disclosure provide an apparatus for processing occlusion in an image, including:
  a viewpoint parameter determining module, configured to determine a current viewpoint parameter used for drawing a current frame of image;
  a predicted depth map obtaining module in communication with the viewpoint parameter determining module and configured to obtain a predicted depth map matching the current viewpoint parameter as a target depth map of the current frame of image; and
  an occlusion culling result determining module in communication with the predicted depth map and configured to perform occlusion culling according to the target depth map, to obtain an occlusion culling result of an object in the current frame of image.

The embodiments of this disclosure provide a computer device, including:
  a communication interface;
  a memory, configured to store a program for implementing the foregoing method for processing occlusion in an image; and
  a processor, configured to load and execute the program stored in the memory, to implement steps of the foregoing method for processing occlusion in an image.

An embodiment of this disclosure provides a non-transitory computer storage medium, storing at least one computer program, the at least one computer program, when executed, causing an apparatus to perform the steps, comprising:
  determining a current viewpoint parameter used for drawing a current image frame;
  obtaining a predicted depth map matching the current viewpoint parameter as a target depth map of the current image frame; and
  performing occlusion culling according to the target depth map to obtain an occlusion culling result of an object in the current image frame.

The embodiments of this disclosure provide a method and apparatus for processing occlusion in an image, a computer device, and a storage medium. In the embodiments of this disclosure, a predicted depth map matching a current viewpoint parameter may be directly obtained from pre-stored predicted depth maps as a target depth map, and then an occlusion culling result of an object in a current frame of image is quickly determined according to the target depth map without the need of waiting at a current frame until a depth map under a current viewing frustum is drawn, thereby greatly shortening the time of obtaining the depth map corresponding to the current viewing frustum, improving occlusion determination efficiency of the object in the virtual scene, and reducing computing overheads of occlusion culling, so that this disclosure is applicable to a mobile platform with relatively poor computing capabilities.

BRIEF DESCRIPTION OF THE DRAWINGS

To describe the technical solutions in the embodiments of this disclosure or the related art more clearly, the following briefly describes the accompanying drawings required for describing the embodiments or the related art. Apparently, the accompanying drawings in the following descriptions show merely some embodiments of this disclosure, and a person of ordinary skill in the art may still derive other drawings from these accompanying drawings without creative efforts.

FIG. 1 is a comparison diagram of a method for processing occlusion in an image in the related art.

DESCRIPTION OF EMBODIMENTS

Figure 2:
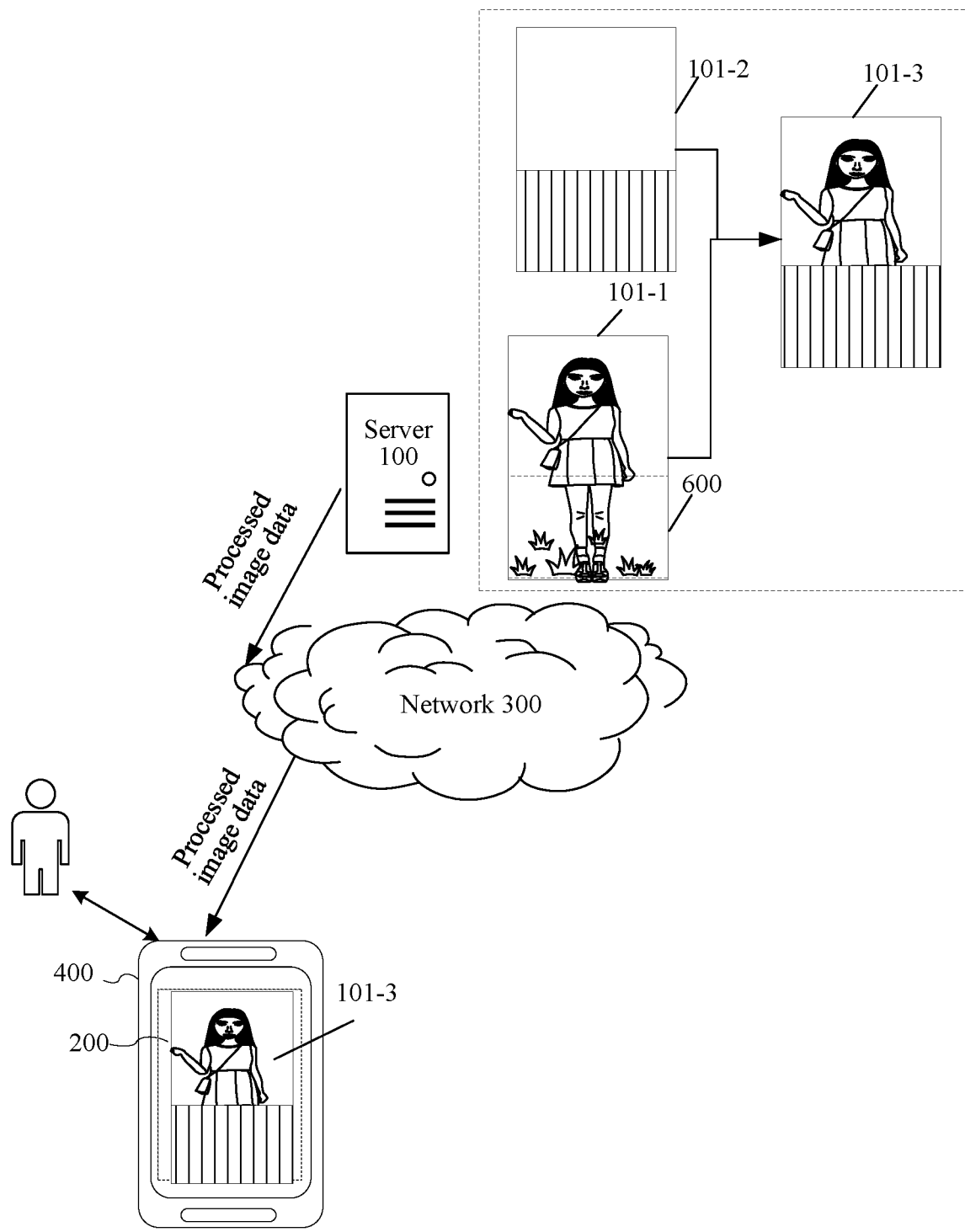
FIG. 2 is a schematic diagram of a system architecture according to an embodiment of this disclosure.

The following describes this disclosure with reference to the accompanying drawings and embodiments. It is to be understood that the specific embodiments described herein are merely used for explaining this disclosure but are not intended to limit this disclosure.

Before the embodiments of this disclosure are further described in detail, a description is made on terms in the embodiments of this disclosure, and the terms in the embodiments of this disclosure are applicable to the following explanations.

Occlusion culling, also referred to as occlusion clipping or occlusion query, means that when a graphics engine renders a scene, objects in the scene are screened according to a series of visibility rules, and only visible objects in a current camera are delivered to a rendering pipeline for rendering. Occlusion culling is one of the visibility determining rules, and a principle of the rule is to determine, according to depth information in a depth map, whether an object is occluded by another object, and cull objects that are invisible because of occlusion from a list of to-be-drawn objects, to reduce a load of the rendering pipeline and improve drawing efficiency of the graphics engine.

In the embodiments of this disclosure, it is found that for an occlusion relationship between objects in a to-be-rendered virtual scene, a hardware occlusion query method is used in the related art. In this method, a depth map does not need to be drawn, and by querying a drawing result of each object, whether the object is occluded by another object is known. However, because of parallelism between work of a graphics processing unit (GPU) and work of a central processing unit (CPU), usually the CPU can obtain a drawing result of a current frame only after waiting until several frames of images are rendered; otherwise, frequent mutual waiting and synchronization between the GPU and the CPU occur, severely affecting entire performance of a system. Therefore, the hardware occlusion query method can usually provide only a historical approximate result, and historical regression verification is further required to obtain a final occlusion culling result.

Moreover, in the embodiments of this disclosure, it is found that in the related art, an offline visibility determining method, that is, a precomputed visible result (potentially visible set, PVS) manner, is used for dividing the entire to-be-rendered virtual scene into many small regions, and visibility relationships among the regions are precomputed. The visibility relationship represents a visibility relationship between objects in a corresponding region. In this way, for a region in which a current camera (or another image acquisition device) is located, the previously precomputed visibility relationship may be queried to obtain a visible object in a to-be-rendered image, and other objects are occlusion objects that are culled. It can be seen that, this manner requires only a small quantity of geometric operations and table lookup operations, which is extremely fast. However, a relatively large internal memory is required to store precomputed information, and the visibility determining is based on a region not a viewpoint, resulting in relatively poor effectiveness of occlusion culling; it is applicable to only a static scene.

In the embodiments of this disclosure, it is further found that for an indoor scene, in the related art, a method for processing occlusion in an image based on a portal culling technology is used. That is, objects in this scene are separated in independent regions, and the regions are connected by some portals. Subsequently, which portals are visible is determined according to a position of the current camera, and then which portals and objects are visible in the regions connected by the portals is determined according to a visibility viewing frustum corresponding to the portals. The entire process requires a small amount of calculation, but can be limited to only a specific scene such as the indoor scene.

Based on the analysis of the foregoing four methods for processing occlusion in an image, in the embodiments of this disclosure, four aspects of calculation speed, delay, culling accuracy, and scene adaptability are mainly considered, and comparisons among the four methods are shown in FIG. 1. From the perspective of accuracy, the foregoing hardware occlusion query method and the depth map-based occlusion query method provided in the background may be selected. In mobile platforms (for example, a personal computer (PC) and a manipulation and control platform) with powerful CPU computing performance, the depth map-based occlusion query method may be used. However, CPU computing speeds on some mobile platforms are not powerful enough, and consequently the depth map-based occlusion query method probably cannot be implemented. Therefore, in the embodiments of this disclosure, the depth map-based occlusion query method is optimized to obtain a new depth map-based method for processing occlusion in an image.

In the related art, graphics engines have respective depth map occlusion culling solutions, and obtaining of a depth map is a core issue. A hardware solution is to draw a depth map of an occlusion body by using the GPU. An advantage of the hardware solution is that a drawing speed is fast and no additional occlusion models are required; a disadvantage is that a delay of obtaining the depth map from the GPU to CPU is relatively high, and usually one or more frames are delayed to obtain the depth map. A software solution is to obtain a depth map of an occlusion body by using a software rasterization method on the CPU, and there are no additional delays because the obtaining is completely performed on the CPU. However, because a speed of software rendering performed by the CPU is still quite different from that of hardware rendering performed by a dedicated GPU, precision of the drawn depth map and a quantity of surfaces of the occlusion body are both lower than those of the GPU manner.

In this embodiment of this disclosure, it is found that in the method for processing occlusion in an image in the related art, when the occlusion relationship between the objects in the current frame of image is detected, it is often necessary to wait in the current frame until the depth map under the current viewing frustum is drawn before determining the occlusion culling result of the object in the current frame of image based on the depth map, resulting in a relatively long delay, affecting efficiency of occlusion culling, and failing to apply to a mobile platform with relatively poor computing capabilities. Moreover, regardless of whether the software manner or the hardware manner is used for drawing the depth map, a viewing frustum for drawing the depth map is usually required to be completely the same as a viewing frustum of occlusion determination. This requires that the graphics engine has to first complete drawing of the depth map of the current viewing frustum for the current frame of image before the current frame of image is rendered, that is, to standby until the depth map of the current frame of image is drawn, and then an occlusion object in the current frame of image is determined according to the depth map, resulting in a relatively long time of online waiting.

In view of this, in the embodiments of this disclosure, it is intended to loosen such a condition, in the method for processing occlusion in an image in the related art, that the viewing frustum for drawing the depth map is strictly the same as the viewing frustum of the occlusion determination. That is, a viewing frustum for detecting whether to perform occlusion culling and the viewing frustum for drawing the depth map may have a deviation within a specific range by modifying a rule of occlusion determination, to enable the graphics engine to determine the occlusion object in the current frame of image according to the depth map of the current frame of image predicted and generated in advance without waiting in the current frame until the depth map is drawn. This not only reduces the online waiting time, but also reduces a quantity of times of drawing the depth map. Therefore, amounts of calculation on both the CPU and the GPU are greatly reduced, thereby reducing overall overheads of the occlusion culling and improving system performance, so that a mobile platform with relatively inadequate computing capabilities can achieve the same level of culling precision and effects as a desktop platform.

The technical solutions in the embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

A method for processing occlusion in an image provided in the embodiments of this disclosure is applicable to a computer device. The computer device may be a server or a terminal having a specific computing capability. The terminal may be a smartphone, a tablet computer, or a virtual reality (VR) device (for example, VR glasses). A product type of the computer device is not limited in the embodiments of this disclosure. For example, in a system architecture, the computer device may be shown in a form of a smart mobile terminal. The smart mobile terminal is configured with a display apparatus, and an application (APP) is installed on the smart mobile terminal. The APPs that can be installed on the smart mobile terminal may include, for example, a browser APP, an office software APP, or a game APP, which is not limited herein. When a user uses the browser APP to browse news and pictures, or uses the game APP to play a game, or uses the office software APP to process work, an image engine renders images and displays the rendered images on the display apparatus.

FIG. 2 is a schematic diagram of a system architecture according to an embodiment of this disclosure. As shown in FIG. 2, the computer device is schematically shown in a form of a server 100. The system architecture includes the server 100, a network 300, and a terminal device 400. The terminal device 400 may be a smartphone, a tablet computer, or a VR device. An example in which the terminal device 400 is the smartphone is shown in FIG. 2. The server 100 performs occlusion culling processing on an image requested by the terminal device 400, and sends processed image data to the terminal device 400. After receiving the processed image data, the terminal device 400 performs rendering by using a graphics engine, and displays the image in a display apparatus 200 of the terminal device.

An application scenario of the method for processing occlusion in an image provided in this embodiment of this disclosure is described with reference to FIG. 2.

A game scene is used as an example. The method for processing occlusion in an image may be used as a functional plug-in integrated into a game engine. If a user enables an occlusion culling function, when the user uses a game APP or a game web page to play an online game, before the game server 100 delivers game data, image data corresponding to an occluded object (for example, may be a game role, a building in the game scene, or the like) in a current frame of image 101-1 is culled, and image data with the occluded object culled is delivered to the terminal device 400. The terminal device 400 obtains, through rendering, the current frame of image based on the received image data, and displays the current frame of image in the display apparatus 200 of the terminal device. As shown in FIG. 2, original image data in the current frame of image includes all image data in the image 101-1 and all data in an image 101-2. Actually, a part of a region 600 in the image 101-1 is occluded by a wall in the image 101-2. In the related art, when image rendering is performed, all image data in the image 101-1 and all data in the image 101-2 need to be rendered. In this embodiment of this disclosure, image data corresponding to the region 600 is culled, and only parts of the wall and a character that are not occluded are rendered, that is, image data corresponding to an image 101-3. The image data of the occluded parts does not need to be rendered, thereby shortening image rendering time and improving fluency of the game.

A VR scene is used as an example. In this case, the terminal device 400 in FIG. 2 may be a VR device such as VR glasses. The method for processing occlusion in an image may also be used as a functional plug-in added to a VR APP. If the user enables the occlusion culling function, when the user uses the VR glasses to experience the VR scene, before the server 100 delivers image data, the occluded object in the current frame of image 101-1 is culled, and image data with the occluded object culled is delivered to the terminal device 400. The terminal device 400 obtains, through rendering, the image based on the received image data and displays the image, thereby shortening image rendering time and reducing freezing phenomena of VR imaging.

Figure 3A:
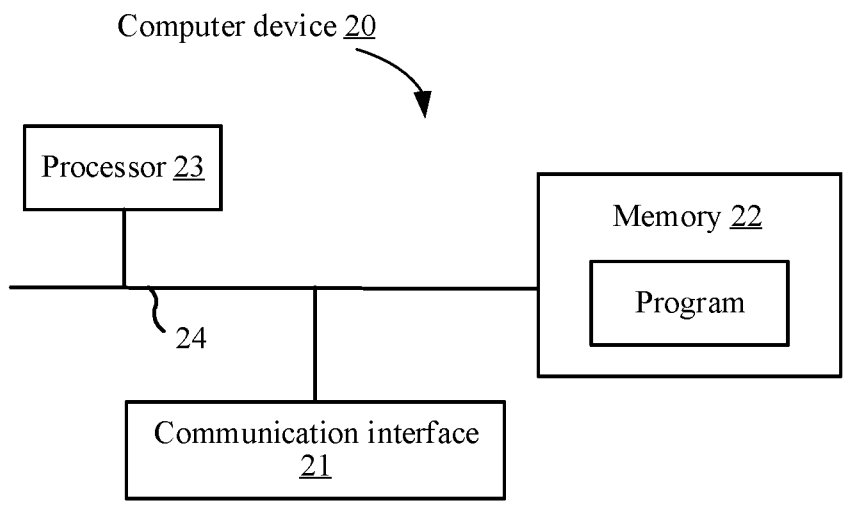
FIG. 3A is a schematic diagram of a hardware structure of a computer device according to an embodiment of this disclosure.

Referring to FIG. 3A, FIG. 3A is a schematic diagram of a hardware structure of a computer device according to an embodiment of this disclosure. The computer device 20 may include a communication interface 21, a memory 22, a processor 23, and a communication bus 24.

In this embodiment of this disclosure, the communication interface 21, the memory 22, and the processor 23 may communicate with each other through the communication bus 24, and there may be at least one communication interface 21, at least one memory 22, at least one processor 23, and at least one communication bus.

In some embodiments, the communication interface 21 may be an interface of a communication module, for example, an interface of a GSM module, or may be a serial/parallel port. A type of the communication interface 21 is not limited in the embodiments of this disclosure.

The processor 23 may be a CPU or an application-specific integrated circuit (ASIC) or may be one or more integrated circuits configured to implement the embodiments of this disclosure.

The memory 22 may include a high-speed random access memory (RAM), or may further include a non-volatile memory, for example, at least one magnetic disk storage.

The memory 22 stores a program, and the processor 23 invokes the program stored in the memory 22, to implement steps of the foregoing method for processing occlusion in an image applicable to the computer device. For a specific implementation process, refer to the descriptions of corresponding parts in the foregoing method embodiments.

In an actual application, the computer device may be a product such as a server or a terminal device that can implement an image drawing function. The product type of the computer device is not limited in the embodiments of this disclosure.

Figure 3B:
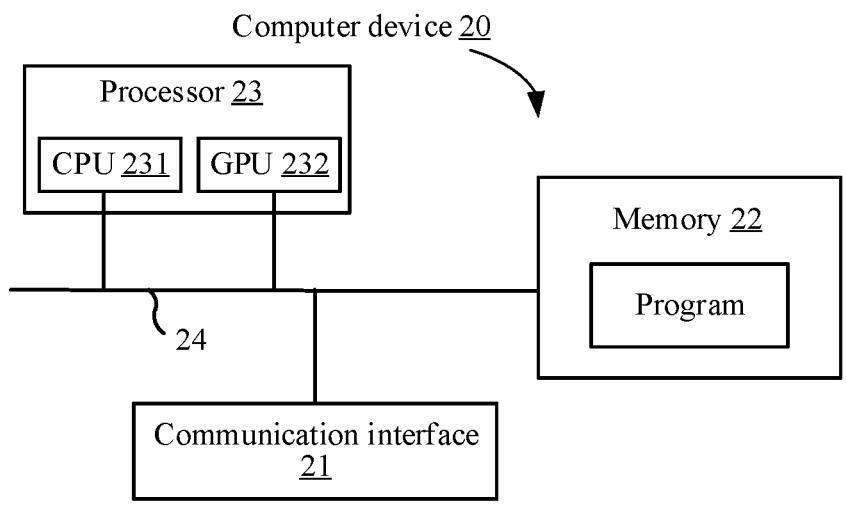
FIG. 3B is a schematic diagram of another hardware structure of a computer device according to an embodiment of this disclosure.

Referring to FIG. 3B, FIG. 3B is a schematic diagram of another hardware structure of a computer device according to an embodiment of this disclosure. The computer device 20 may include a communication interface 21, a memory 22, a processor 23, and a communication bus 24.

In this embodiment of this disclosure, the communication interface 21, the memory 22, and the processor 23 may communicate with each other through the communication bus 24, and there may be at least one communication interface 21, at least one memory 22, at least one processor 23, and at least one communication bus.

In some embodiments, the communication interface 21 may be an interface of a communication module, for example, an interface of a GSM module, or may be a serial/parallel port. A type of the communication interface 21 is not limited in the embodiments of this disclosure.

In FIG. 3B, the processor 23 may include a CPU 231 and a GPU 232. In some embodiments, the processor 23 may alternatively be an ASIC or may be one or more integrated circuits configured to implement the embodiments of this disclosure.

The memory 22 may include a high-speed RAM, or may further include a non-volatile memory, for example, at least one magnetic disk storage.

The memory 22 stores a program, and the processor 23 invokes the program stored in the memory 22, to implement steps of the foregoing method for processing occlusion in an image applicable to the computer device. For a specific implementation process, refer to the descriptions of corresponding parts in the foregoing method embodiments.

In an actual application, the computer device may be a product such as a server or a terminal device that can implement an image drawing function. The product type of the computer device is not limited in the embodiments of this disclosure.

Figure 4:
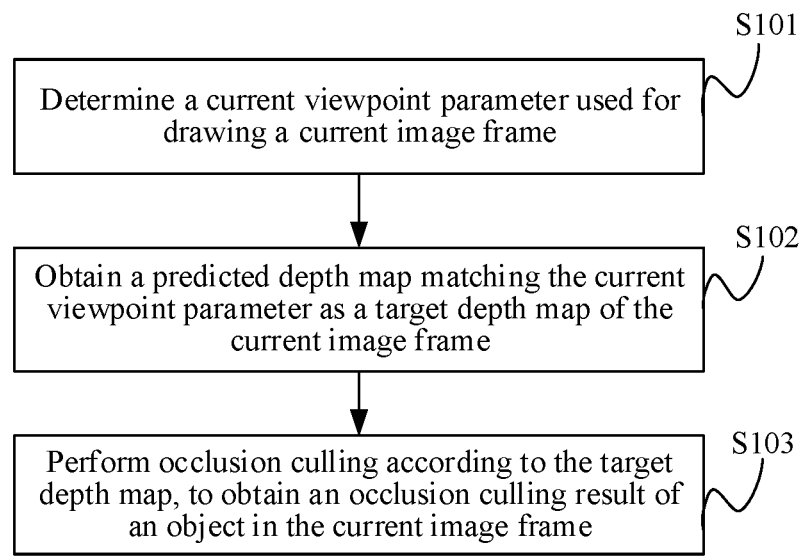
FIG. 4 is a schematic flowchart of a method for processing occlusion in an image according to an embodiment of this disclosure.

Referring to FIG. 4, FIG. 4 is a schematic flowchart of a method for processing occlusion in an image according to an embodiment of this disclosure. The method is applicable to a computer device. For example, the method may be performed by a graphics engine in the computer device, and the method may be used for performing occlusion culling. As shown in FIG. 4, the method may include but not limited to the following steps:

Step S101. Determine a current viewpoint parameter used for drawing a current frame of image.

In three-dimensional computer graphics, a viewing frustum may be a visible region on a screen in a three-dimensional world, that is, a field of view of a virtual camera (or a virtual image acquisition device such as a virtual video camera). An actual shape of the region depends on a camera lens that is being simulated, and a common shape of the region is a frustum of a rectangular pyramid, but is not limited thereto. In an actual application, two planes that cut a quadrangular pyramid into a frustum may be referred to as a near plane and a far plane. If an object is closer to the virtual camera than the near plane or farther away from the virtual camera than the far plane, the object is not displayed. Generally, a viewing frustum may be described by parameters such as a field-of-view angle, an aspect ratio, and distances from the near plane and the far plane to the virtual camera.

The viewpoint parameters of this embodiment of this disclosure may include a viewpoint position, a line-of-sight direction, a viewing angle, and other parameters of the virtual camera (or a virtual image acquisition device such as the virtual video camera) of the current frame of image. The viewpoint parameters may be determined based on a viewing frustum for drawing the current frame of image. Content included in the viewpoint parameters and an obtaining process of the viewpoint parameters are not limited in this embodiment of this disclosure. Generally, an image outside a range of the viewpoint (that is, outside a range of the viewing frustum) is usually invisible, and therefore an object outside the range of the viewpoint may be directly culled from a list of to-be-rendered objects of a to-be-rendered virtual scene. In this embodiment of this disclosure, occlusion determination is mainly performed on an object in the range of the viewpoint.

In an actual application, with drawing of different frames of images of the to-be-rendered virtual scene, the viewpoint parameters of the virtual camera are changed accordingly. Generally, changes in content of neighboring frames of images are usually relatively small, and changes in corresponding viewpoint parameters are also relatively small. Therefore, when obtaining a depth map of the current frame of image, the depth map may be obtained from the most similar predicted depth maps generated in advance, instead of drawing the depth map of the current frame of image simultaneously. For this implementation process, refer to the descriptions in the corresponding steps below, and the changes of the viewpoint parameters may be determined according to content of the scene.

Step S102. Obtain a predicted depth map matching the current viewpoint parameter as a target depth map of the current frame of image.

Based on the above analysis of the embodiments of this disclosure, to avoid waiting in the current frame until drawing of the depth map is completed, in a process of drawing each frame of image in the current scene, in this embodiment of this disclosure, the viewpoint parameters for drawing subsequent frames of images are predicted in advance, and corresponding depth maps are generated and stored for the predicted viewpoint parameters. In this way, when the frames of images (recorded as the current frame of image) are actually drawn subsequently, there is no need to wait online until the depth map corresponding to the current frame of image is drawn, and a predicted depth map matching the current viewpoint parameter may be directly obtained from pre-stored predicted depth maps as the target depth map corresponding to the current frame of image, thereby resolving a delay problem in the method for processing occlusion in an image in the related art.

A generation process and a storage manner of the predicted depth map and implementation methods of how to determine which predicted depth map matches the current viewpoint parameter are not limited in the embodiments of this disclosure.

In some embodiments, for the pre-stored predicted depth maps, a possible viewpoint parameter, when a subsequent frame of image is drawn, can be predicted through predicting a movement trajectory of the virtual camera (that is, a movement trajectory of a viewpoint for drawing each frame of image of a target scene is predicted), so as to draw a corresponding depth map, according to the possible viewpoint parameter, as a predicted depth map corresponding to the possible viewpoint parameter, that is, a frame of depth map corresponding to a frame of image drawn under the predicted viewpoint parameter. The predicted depth maps are stored. It may be seen that the predicted depth map is generated based on a predicted viewpoint parameter of a future frame of image of the current frame of image in the target scene, rather than generated when the future frame of image is actually drawn. A method for generating the depth maps of the to-be-rendered virtual scene that are under different viewpoints is not limited in the embodiments of this disclosure, and a depth map under a specific viewpoint may be generated by using hardware, software, or another manner.

The foregoing depth map may be obtained by storing a depth of each generated pixel in a buffer when the object is rendered by the rendering pipeline. Generally, the depth map may form a two-dimensional array x-y that stores a depth of each screen pixel. If another object in the scene also generates a rendering result in the same pixel, the graphics engine may compare depths of the two objects, retain the object closer to an observer (that is, the object closest to the viewpoint position is retained), and store depth data of the retained object in the depth map. In this way, according to the depth map, the graphics engine may correctly generate a depth perception effect of the scene, that is, the object closer to the viewpoint occludes the object farther away from the viewpoint.

Therefore, it can be seen that the depth map may be used as an expression of three-dimensional scene information, and a grayscale value of each pixel in the image may be used for representing a distance between a specific point in the scene and the virtual lens (that is, the viewpoint position). Therefore, in this embodiment of this disclosure, according to a comparison result of depth information of each object in the depth map (that is, a grayscale value of each pixel of the object), the distance of the each object to the current viewpoint position is obtained, so as to determine which objects are visible, and which objects are invisible because of occlusion of other objects.

Step S103. Perform occlusion culling according to the target depth map to obtain an occlusion culling result of an object in the current frame of image.

Following the above description, because the depth data in the depth map can represent the distance from the object to the viewpoint position in the virtual scene, comparing and analyzing the depth information of each object in the depth map can accurately acquire an occlusion culling result of each object in the current frame of image, that is, determine, in a range of a current viewing frustum, which objects are visible, and which objects are occluded. The occluded object is then culled from a list of virtual objects of the to-be-rendered virtual scene (that is, a list of to-be-rendered objects in the virtual scene). Image rendering is performed on the remaining virtual objects to obtain a three-dimensional image of the virtual scene. It may be seen that in this embodiment of this disclosure, in this manner, the object occluded by other objects in the virtual scene in the list of virtual objects of the to-be-rendered virtual scene is recognized more accurately and quickly, and is culled in time, thereby avoiding rendering the occluded object, greatly reducing rendering workload, and improving image rendering efficiency.

Implementation methods of how to determine whether an object in the scene is occluded according to the depth map are not limited in this embodiment of this disclosure.

Based on the foregoing, in the embodiments of this disclosure, during rendering processing of the current frame of image, the viewpoint parameter for drawing the future frames of images in the same scene is predicted, and the corresponding predicted depth map is generated and stored for the obtained predicted viewpoint parameter. In this way, after the future frame of image becomes the current frame of image, there is no need to wait online until the depth map of the current frame of image is drawn. In the embodiments of this disclosure, the predicted depth map matching the current viewpoint parameter is directly obtained from the pre-stored predicted depth maps as the target depth map of the current frame of image, and then the occlusion culling result of the object in the current frame of image is quickly and accurately obtained according to the target depth map, thereby improving occlusion determination efficiency and accuracy of the object in the virtual scene. Moreover, in the embodiments of this disclosure, based on this, the determined occluded object in the range of the viewpoint for drawing each frame of image is culled from the list of virtual objects of the to-be-rendered virtual scene, reducing a quantity of virtual objects that need to be rendered and improving rendering efficiency of the virtual scene. In addition, in the embodiments of this disclosure, an overall amount of calculation is reduced, so that the method for processing occlusion in an image provided in the embodiments of this disclosure is applicable to a mobile platform with relatively poor computing capabilities, that is, applicable to a low-end computer device.

Based on the above analysis, in an actual application of the embodiments of this disclosure, a viewing frustum (for example, the foregoing viewpoint parameter) for obtaining the target depth map and a viewing frustum of the current frame of image usually have a specific deviation. In the related art, a method for determining whether an object is occluded is no longer applicable to the method for processing occlusion in an image described in the foregoing embodiments of this disclosure because the viewing frustum for obtaining the depth map is required to be strictly the same as the viewing frustum of the occlusion determination.

When whether an object is occluded is determined, several objects with high screen-to-body ratios are first selected from a scene as occlusion bodies, depths of the occlusion bodies are drawn on the depth map, then vertexes P of bounding boxes of other objects in the scene are obtained, and a vertex Q in a screen space into which each vertex P is transformed through a viewport transformation matrix MV and a perspective transformation matrix MP is determined. Two extreme points SMin and SMax of a screen space bounding box formed after the bounding box is projected in the screen space are further obtained. If a minimum depth of the bounding box is less than all depths of regions covered by the transformed object bounding box, it is determined that the object is occluded.

The perspective transformation matrix is used for projecting a picture onto a new view plane, also referred to as projection mapping, and a three-dimensional model is displayed on a two-dimensional viewport, that is, a process from three dimensions to two dimensions.

The bounding box is an algorithm for solving an optimal bounding space of a set of discrete points. The basic idea is to use a geometric solid (referred to as a bounding box) with slightly large volume and simple features to approximately replace a complex geometric object. Common bounding box algorithms include an axis-aligned bounding box (AABB), a bounding sphere, an oriented bounding box (OBB), a fixed direction hull (FDH) or a k-discrete oriented polytope (K-DOP), and the like.

The method for determining, based on the depth map, whether the object is occluded is not limited to this manner in the embodiments of this disclosure.

Figure 5:
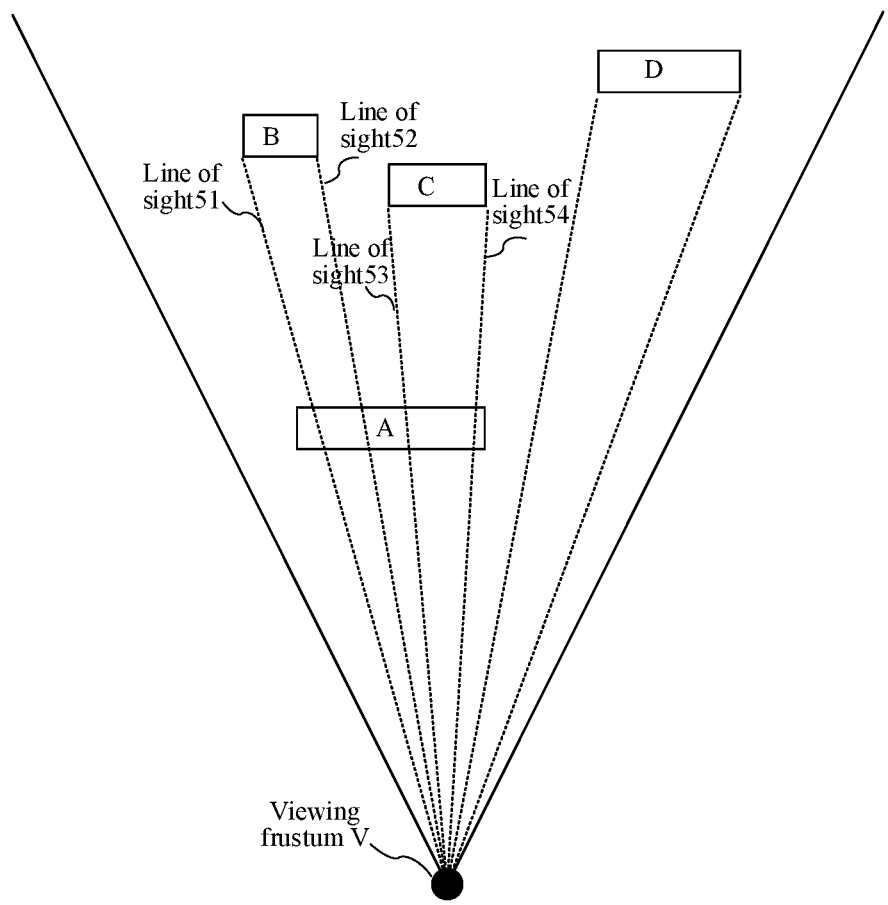
FIG. 5 is a schematic diagram of occlusion determination in the related art.

Based on this manner, in a viewing frustum diagram shown in FIG. 5, a line of sight 51 and a line of sight 52 from a viewpoint corresponding to a viewing frustum V to an object B are occluded by an object A, and a line of sight 53 and a line of sight 54 from the viewpoint corresponding to the viewing frustum V to an object C are also occluded by the object A. Therefore, it may be determined that the objects B and C are occluded by the object A, while an object D is visible. However, this implementation is limited to a case that the viewing frustum for drawing the depth map is exactly the same as the viewing frustum of the occlusion determination. Subject to this condition, when there is a relatively large delay in the method for processing occlusion in an image in the related art, efficiency of obtaining the occlusion culling result under the current viewing frustum is relatively low.

In view of this, the embodiments of this disclosure propose to correct the perspective matrix MP in the foregoing basic code, so that the corrected perspective matrix can correspondingly offset an object position relative to a viewpoint position of the occlusion determination, and a problem of whether the original object is visible under a new viewing frustum is equivalent to a problem of whether the offset object is visible under the old viewing frustum. The corrected perspective matrix may be determined based on the viewing frustum of the current frame of image and the viewing frustum of the target depth map corresponding to the current frame of image.

Figure 6:
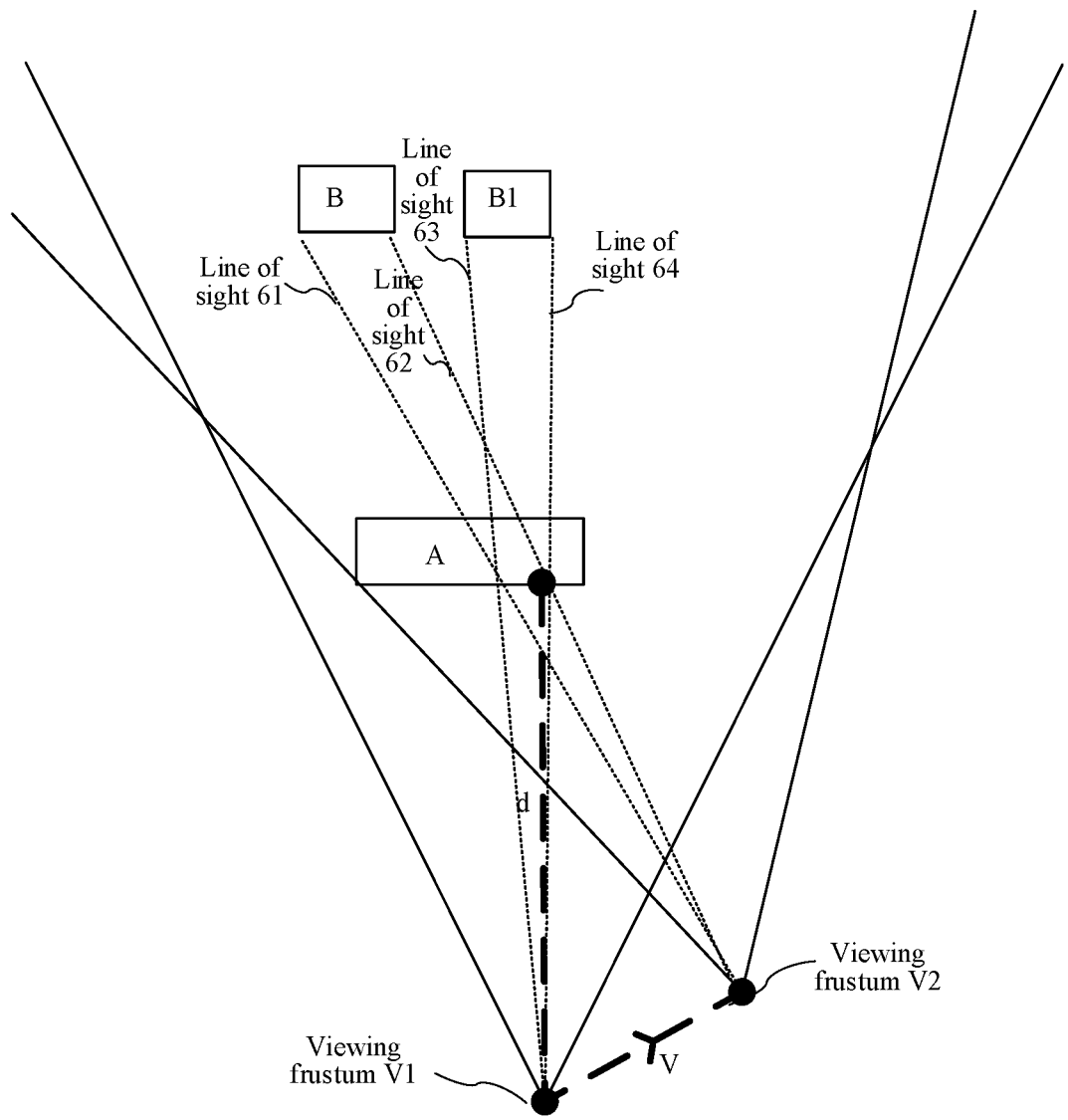
FIG. 6 is a schematic diagram of a type of occlusion determination corresponding to a method for processing occlusion in an image according to an embodiment of this disclosure.

For example, FIG. 6 is a schematic diagram of visibility of the object under the viewing frustum. The viewing frustum of the current frame of image may be a viewing frustum V1 in FIG. 6, and under the viewing frustum, an occlusion relationship between objects may refer to an occlusion relationship between an object B and an object A under the viewing frustum V1 in FIG. 6. A new viewing frustum V2 (that is, the obtained viewing frustum of the target depth map corresponding to the current frame of image) is obtained by correcting a perspective matrix under the viewing frustum V1, and has, as shown in FIG. 6, a specific deviation from the original viewing frustum V1, and an object B1 represents a position of the object corrected by the perspective matrix under the new viewing frustum V2. It is to be understood that the object B and the object B1 shown in FIG. 6 are positions of the same object under different viewing frustums. It can be seen from FIG. 6 that for the occlusion object A, visibility of the object B to the viewing frustum V2 is equivalent to visibility of object B1 to the viewing frustum V1. Therefore, because a line of sight 61 and a line of sight 62 from a viewpoint corresponding to the viewing frustum V2 to the object B are occluded by the object A, the object B is invisible under the viewing frustum V2, and the object B1 is also invisible under the viewing frustum V1.

Figure 7:
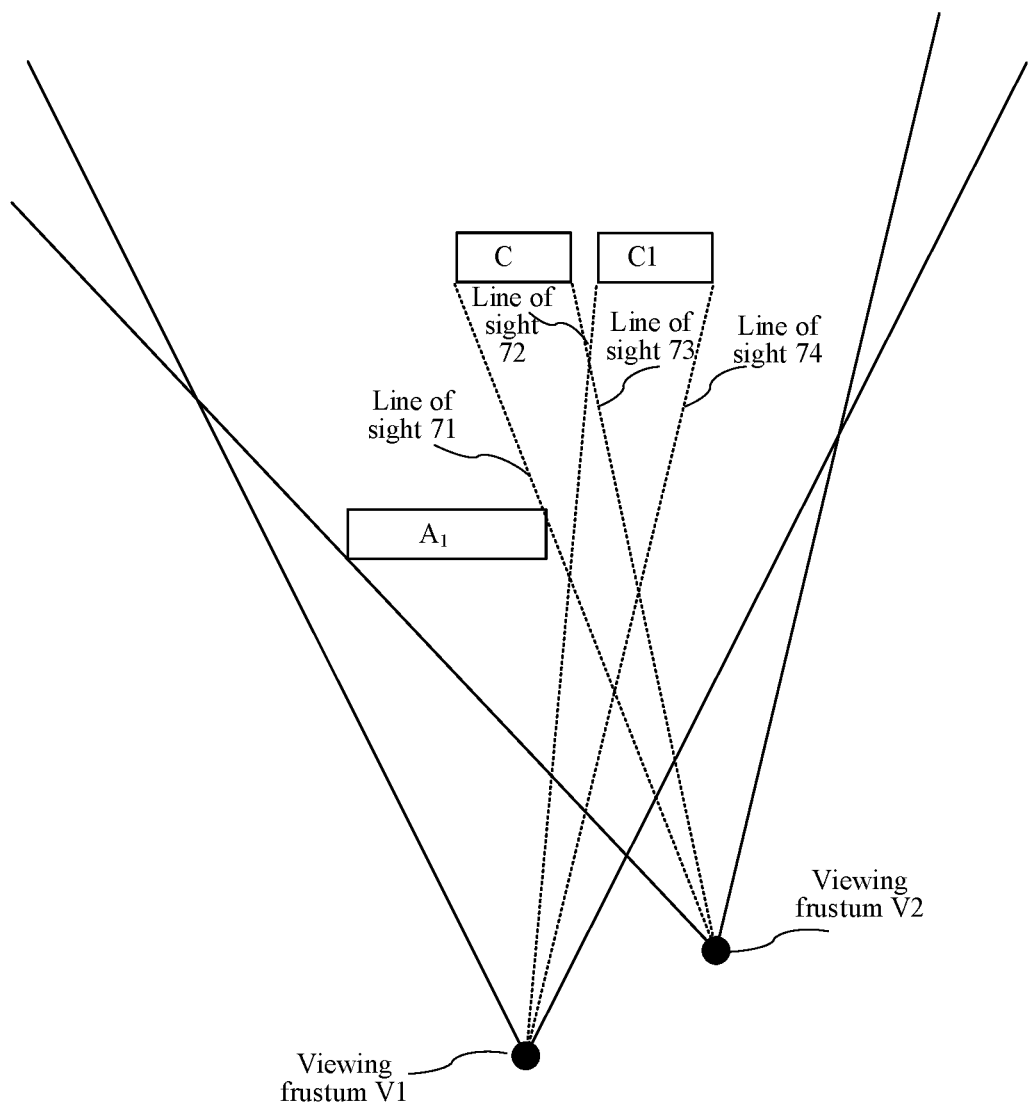
FIG. 7 is a schematic diagram of another type of occlusion determination corresponding to a method for processing occlusion in an image according to an embodiment of this disclosure.

Similarly, referring to FIG. 7, an object C1 is a position of an object C corrected by the perspective matrix, the object C under the viewing frustum V1 and the object C1 under the viewing frustum V2 represent positions of the same object under different viewing frustums. It can be seen from FIG. 7 that for an occlusion object A1, visibility of the object C1 to the viewing frustum V1 is equivalent to visibility of the object C to the viewing frustum V2. Therefore, because neither a line of sight 73 nor a line of sight 74 from a viewpoint corresponding to the viewing frustum V1 to the object C1 is occluded by the object A1, the object C1 is visible under the viewing frustum V1, the object C is also visible under the viewing frustum V2, and vice versa.

Based on the above analysis, in the embodiments of this disclosure, the condition, in the conventional method for processing occlusion in an image, that the viewing frustum for drawing the depth map has to be strictly the same as the viewing frustum of the occlusion decision is loosened, allowing a specific deviation between the two viewing frustums, an equivalent conversion relationship for determining whether the object is visible is obtained, and an occlusion culling result of each object under a current scene is determined according to the equivalent conversion relationship, thereby reducing computing overheads, improving accuracy of culling, and being applied to a low-level mobile platform.

Therefore, in the embodiments of this disclosure, to improve overall performance of the graphics engine and resolve the delay problem, in the solution described in the foregoing embodiments, after the current frame of image is drawn, there is no need to wait until a depth map of a current viewpoint parameter is generated, but directly read the predicted depth map that matches the current viewpoint parameter stored in advance, then determine the corrected perspective matrix according to the viewing frustum of the current frame of image and a viewing frustum for generating the predicted depth map, that is, determine a visibility equivalence relation between the objects under the two viewing frustums, and then determine the occlusion culling result of the object in the current frame of image according to the corrected perspective matrix.

The viewing frustum of the current frame of image is equivalent to the viewing frustum V1 in FIG. 6 and FIG. 7, and the viewing frustum of the predicted depth map is equivalent to the viewing frustum V2 in FIG. 6 and FIG. 7. Based on the above analysis of the corrected perspective matrix, in the embodiments of this disclosure, after the predicted depth map (that is, the foregoing target depth map) corresponding to the current viewpoint position is obtained, depth data of each object, in the current frame of image, in the predicted depth map may be directly obtained, and then whether a corresponding object is occluded is determined according to the obtained depth data. For a determining implementation process, refer to the description of the foregoing corresponding parts, but the determining implementation process is not limited to implementations described in the embodiments of this disclosure.

Based on the analysis of the method for processing occlusion in an image in the foregoing embodiments, to resolve the delay problem caused by waiting in the current frame until drawing of the depth map of the current frame of image is completed and reduce a quantity of times of drawing of the depth map, this embodiment of this disclosure proposes to, when the current frame of image is obtained, directly obtain a pre-buffered predicted depth map matching the viewpoint parameter of the current frame of image without waiting until drawing of the depth map of the current frame of image is completed, and then obtain the occlusion culling result of the object in the current frame of image directly according to the predicted depth map used as the target depth map of the current frame of image.

Figure 8:
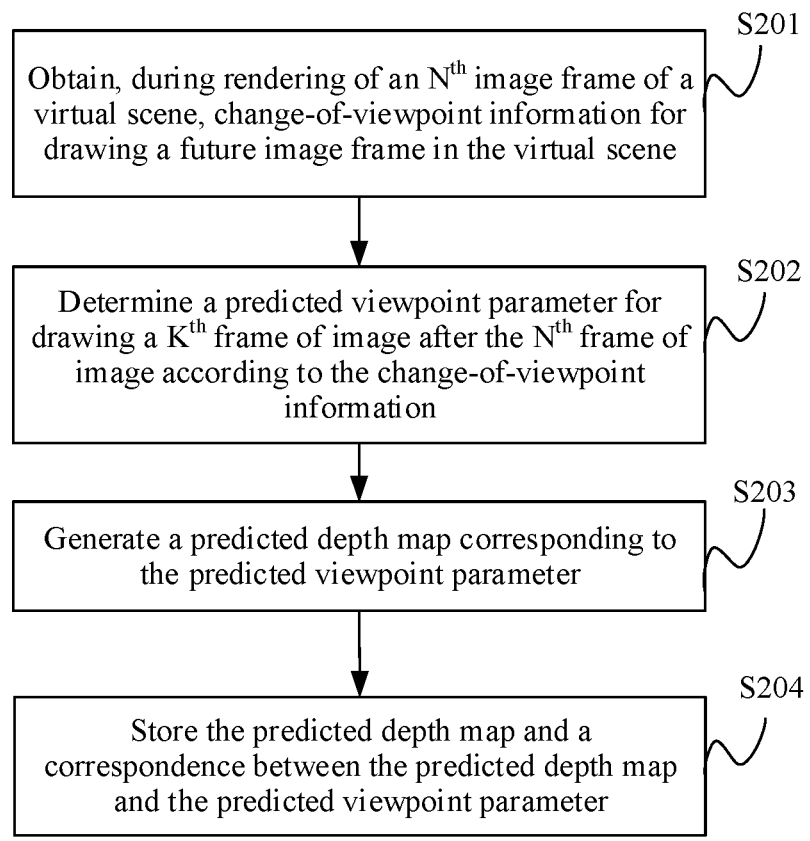
FIG. 8 is a schematic flowchart of a method for obtaining a predicted depth map in a method for processing occlusion in an image according to an embodiment of this disclosure.

An obtaining process of the predicted depth map is mainly described below, but is not limited to the obtaining process described in the following embodiments of this disclosure. For a process of how to obtain the occlusion culling result of the current frame of image according to the predicted depth map, refer to descriptions of corresponding parts in the foregoing embodiments. As shown in FIG. 8, the method may include, but not limited to the following steps:

Step S201. Obtain, during rendering of an $N^{th}$ frame of image of a virtual scene, change-of-viewpoint information for drawing a future frame of image in the virtual scene.

The $N^{th}$ frame of image may be any frame of image for obtaining a target scene (that is, a scene that needs to be rendered), N being a positive integer, but a value of N is not limited in this embodiment of this disclosure. The future frames of images are, for the currently rendered $N^{th}$ frame of image, frames of images in the virtual scene that need to be drawn but have not been drawn, that is, one or more frames of images that need to be drawn in the future.

Step S202. Determine a predicted viewpoint parameter for drawing a $K^{th}$ frame of image after the $N^{th}$ frame of image according to the change-of-viewpoint information.

In an actual application of this embodiment of this disclosure, a change rule of a viewpoint, that is, a moving trend of a virtual camera, may be predicted according to the change-of-viewpoint information for drawing each frame of image of the virtual scene, where the change-of-viewpoint information may include a variation direction of a line of sight, a variation trajectory of a viewpoint position, and the like.

In some embodiments, for a to-be-rendered virtual scene, a viewpoint change rule for drawing each frame of image of the virtual scene may be pre-configured. In this way, when any frame of image of the virtual scene is actually drawn, the viewpoint change rule corresponding to the virtual scene may be directly obtained, and then the predicted viewpoint parameter of the future frame of image is obtained, but this application is not limited to such a method for obtaining the predicted viewpoint parameter.

Therefore, it can be seen that, the $K^{th}$ frame of image after the $N^{th}$ frame of image in step S202 may refer to a specific frame of image in the foregoing future frame of image. A value of K is not limited in this embodiment of this disclosure and may be an integer value from 1 to 5.

Step S203. Generate a predicted depth map corresponding to the predicted viewpoint parameter.

An implementation method for generating a depth map of an image under a specific viewpoint is not limited in this embodiment of this disclosure, and the depth map may be drawn by using hardware, software, or another manner.

Step S204. Store the predicted depth map and a correspondence between the predicted depth map and the predicted viewpoint parameter.

In this embodiment of this disclosure, to resolve a problem of a speed of obtaining the depth map and a delay problem, according to the viewpoint change rule for drawing each frame of image of the virtual scene, viewpoint parameters for obtaining several frames of images after the $N^{th}$ frame of image are predicted, and in a process of rendering the $N^{th}$ frame of image, the depth map under the viewpoint parameters for obtaining the several frames of images after the $N^{th}$ frame of image is generated in advance. In this way, like the description of the foregoing embodiment, when several frames of images need to be rendered, it is unnecessary to wait until the depth map is drawn, but directly read the pre-generated predicted depth map, reducing invalid waiting time.

Based on the above analysis, during rendering of the $N^{th}$ frame of image, a viewpoint parameter for drawing a $(N+K)^{th}$ frame of image in the same scene can be predicted, and the viewpoint parameter is not the viewpoint parameter for actually drawing the $(N+K)^{th}$ frame of image. Generally, the predicted viewpoint parameter is usually different from the viewpoint parameter for actually drawing the $(N+K)^{th}$ frame of image, so that a viewing frustum at the $(N+K)^{th}$ frame and a viewing frustum for drawing a corresponding predicted depth map have a deviation within a specific range, and positions of the same object under the two viewing frustums are different.

Based on descriptions of corresponding parts in the foregoing embodiment, a problem of whether an object (that is, an object of the $(N+K)^{th}$ frame under a viewing frustum) in the to-be-rendered virtual scene is visible in a range of a viewing frustum of a predicted depth map is equivalent to a problem of whether an offset object (that is, an object under a viewing frustum of the corresponding predicted depth map) is visible in the range of the viewing frustum of the $(N+K)^{th}$ frame. In this way, in this embodiment of this disclosure, a real depth map of the $(N+K)^{th}$ frame need not to be obtained, and an occlusion culling result of the $(N+K)^{th}$ frame of image can be directly determined according to obtained depth data of each object in a corresponding predicted depth map, that is, determine which objects are occluded objects and which objects are visible objects, and then the visible objects are conveyed to a rendering pipeline for rendering, thereby avoiding performing unnecessary rendering operations on the occluded objects and reducing image rendering efficiency.

In some embodiments, after the predicted depth map matching the current viewpoint parameter is obtained, in addition to determining the visibility of the object, that is, determining whether the object is occluded according to the equivalent transformation method of the visibility of the object under the two viewing frustums described in the foregoing embodiment, an original position of the object may be connected to a corrected position, to form a position of a big object. As shown in FIG. 6, the object B may be connected to the object B1 to form an object B2, and then according to depth data of the object B2 in the predicted depth map, whether the object B2 is occluded is determined. If yes, it may be considered that the object B is also occluded; otherwise, it may be considered that the object B is visible. In this manner, a probability of wrong culling may be further reduced, that is, culling precision is further improved.

In some scenes with complex occlusion relationships, the occlusion culling result obtained according to the method for processing occlusion in an image provided in this embodiment of this disclosure is generally not precise enough. In this case, in this embodiment of this disclosure, in a process of obtaining the occlusion culling result according to the predicted depth map, a constraint condition for determining whether the object is occluded may be added, and is no longer limited to the constraint condition given above: the minimum depth data of the bounding box of the object is less than all the depth data of the region covered by the bounding box. Content of the newly added constraint condition is not limited in this embodiment of this disclosure, and may be determined through tests according to actual requirements.

Figure 9:
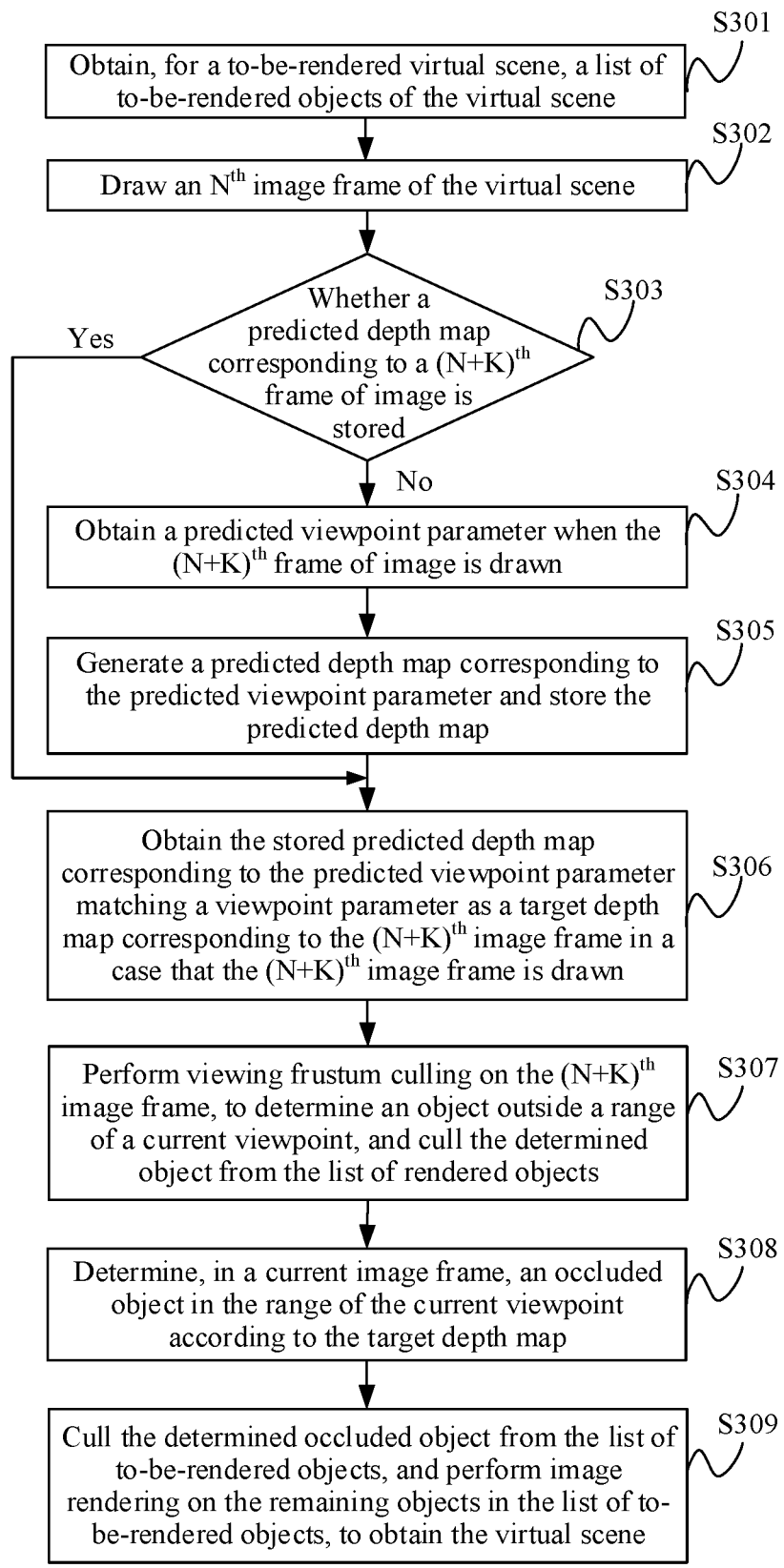
FIG. 9 is a schematic flowchart of another method for processing occlusion in an image according to an embodiment of this disclosure.

Based on the descriptions of the foregoing embodiments, this embodiment of this disclosure provides a detailed embodiment of a method for processing occlusion in an image. Referring to a schematic flowchart shown in FIG. 9, the method may include but not limited to the following steps:

Step S301. Obtain, for a to-be-rendered virtual scene, a list of to-be-rendered objects of the virtual scene.

The list of to-be-rendered objects includes objects in the virtual scene. A recording manner of virtual objects in the virtual scene is not limited in this embodiment of this disclosure, that is, a recording manner of the virtual objects in the list of to-be-rendered objects is not limited in this embodiment of this disclosure. The recording manner may be a table recording manner or another recording manner.

Step S302. Draw an $N^{th}$ frame of image of the virtual scene.

To resolve a problem of obtaining a depth map and a delay problem, in this embodiment of this disclosure, a position after several frames (K frames) may be predicted according to a moving trend of a video camera, and a predicted depth map corresponding to a $(N+K)^{th}$ frame of image is stored in advance.

Step S303. Detect whether the predicted depth map corresponding to the $(N+K)^{th}$ frame of image is stored; if not, perform step S304, and if yes, perform step S306.

Step S304. Obtain a predicted viewpoint parameter when the $(N+K)^{th}$ frame of image is drawn.

Step S305. Generate a predicted depth map corresponding to the predicted viewpoint parameter and store the predicted depth map.

Step S306. Obtain the stored predicted depth map corresponding to the predicted viewpoint parameter matching a viewpoint parameter as a target depth map corresponding to the $(N+K)^{th}$ frame of image when the $(N+K)^{th}$ frame of image is drawn.

Based on the analysis of the foregoing embodiment, to resolve the problem of obtaining the depth map and the delay problem, in this embodiment of this disclosure, a viewpoint parameter for drawing an image after several frames is predicted in advance, and a corresponding depth map is generated, that is, when an $N^{th}$ frame of image is drawn, the viewpoint parameter for drawing the $(N+K)^{th}$ frame of image is predicted, and the corresponding predicted depth map is generated and then stored, so as to directly read, from the stored predicted depth maps corresponding to different predicted viewpoint parameters when the $(N+K)^{th}$ frame of image is actually drawn, a predicted depth map corresponding to a predicted viewpoint parameter that is most similar to a current viewpoint parameter as a depth map of the $(N+K)^{th}$ frame of image without the need of waiting until the depth map is generated.

In an actual application, to reduce waiting time for generating the depth map, after a rendering instruction is initiated to the depth map, a rendering thread usually does not immediately obtain the corresponding depth map, but obtains the corresponding depth map when the $(N+K)^{th}$ frame of image is actually obtained, thereby reducing invalid waiting time.

Step S307. Perform viewing frustum culling on the $(N+K)^{th}$ frame of image, to determine an object outside a range of a current viewpoint, and cull the determined object from the list of to-be-rendered objects.

To improve rendering efficiency, in this embodiment of this disclosure, before the occlusion culling is performed, culling operations, for example, viewing frustum culling, distance culling, screen-to-body ratio culling, static precomputed visibility culling PVS, and another culling manner, may first be performed on an overall image of a scene, to perform the viewing frustum culling on the $(N+K)^{th}$ frame of image. A process of culling in step S307 is not limited in this embodiment of this disclosure, and is not limited to the culling manners enumerated in this embodiment of this disclosure.

Because a viewing frustum is a visible pyramid range of an image acquisition device in a scene, and is formed by six surfaces: upper, lower, left, right, near, and far surfaces. Generally, scenery in the viewing frustum is visible, and scenery outside the viewing frustum is invisible. Based on this, the viewing frustum culling may be performed to cull an image outside the viewing frustum, that is, cull an occluded object outside a range of the viewing frustum (that is, outside the viewing frustum).

Step S308. Determine, in a current frame of image, an occluded object in the range of the current viewpoint according to the target depth map.

It may be seen that in this embodiment of this disclosure, the object outside the viewing frustum may be directly determined as the occluded object and be culled. For the object inside the viewing frustum, occlusion determination may be implemented according to described content of corresponding parts in the foregoing embodiments.

Step S309. Cull the determined occluded object from the list of to-be-rendered objects, and perform image rendering on the remaining objects in the list of to-be-rendered objects, to obtain the virtual scene.

In this embodiment of this disclosure, the foregoing two manners may be used to quickly and accurately recognize the occluded objects in the to-be-rendered virtual scene, including the occluded objects outside the viewing frustum and the occluded objects inside the viewing frustum that are in the frames of images, avoiding rendering the occluded object in the process of image rendering, and improving the rendering efficiency.

In a process of recognizing the occluded object inside the viewing frustum, in this embodiment of this disclosure, a manner of viewing frustum correction is used for implementing the method for processing occlusion in an image, that is, a depth map under a viewing frustum that is different (but has a small deviation) from the viewing frustum of the current frame is used for occlusion culling, thereby reducing delay requirements for obtaining the depth map, improving occlusion determination efficiency of the object in the virtual scene, and reducing a quantity of times of drawing of the depth map, so that overheads of occlusion culling are greatly reduced, system performance is improved, and the method is applicable to more low-end mobile platforms (that is, platforms of mobile computer devices with limited computing and rendering capabilities), that is, requirements for the computing capabilities of the mobile platform to which the method is applicable are reduced, and image drawing performed on the mobile platform with relatively poor computing capabilities can also achieve the same level of culling precision and effects as a desktop platform.

In this embodiment of this disclosure, a description is made by using an example in which a game scene is drawn. In a case of drawing any frame of game scene in a game application, in a process of rendering the frame of game scene, whether a corresponding predicted depth map is pre-stored in another frame of game scene that needs to be drawn subsequently may be detected. If not, a viewpoint parameter for drawing another frame of game scene in the future may be predicted during rendering of the frame of game scene, and a corresponding predicted depth map is generated for the viewpoint parameter and stored. In this way, through several frames, when a depth map of the another frame of game scene is drawn, a predicted depth map corresponding to a predicted viewpoint parameter that is most similar to the viewpoint parameter of the frame of game scene may be directly obtained from the stored predicted depth maps as a target depth map of the frame of game scene. Visibility of the target depth map under a viewing frustum for each game object in the frame of game scene is equivalent to visibility of the game object under the current viewing frustum after transformation. Therefore, in this embodiment of this disclosure, it is directly determined, according to a depth value of each game object in the target depth map in the frame of game scene, whether a corresponding game object under the current viewing frustum is visible, that is, an occlusion culling result of the each game object in the current frame of game scene is obtained, and an occluded object in a range of the current viewing frustum in the current frame of game scene is culled, thereby reducing a quantity of rendered objects, and improving rendering efficiency of the game scene.

Moreover, the method for processing occlusion in an image provided in this embodiment of this disclosure requires a relatively low amount of calculation, and is applicable to mobile platforms with relatively poor computing capabilities, for example, some low-end mobile devices and the like, thereby expanding the range of use and improving market competitiveness.

The method for processing occlusion in an image provided in this embodiment of this disclosure may be applied to various image drawing scenes, and is not limited to the drawing scene of the game scene enumerated above. A description is only used as an example for description in this embodiment of this disclosure, application methods in other image drawing scenes are similar, and the examples are not listed one by one in this embodiment of this disclosure.

In addition, in this embodiment of this disclosure, the depth map may be drawn by using hardware (for example, the depth map may be drawn by using the GPU), or may be drawn by using software (for example, the depth map may be drawn by using the CPU). However, in a process of drawing the depth map by using the software, an extra simple model with a small quantity of surfaces is usually made for each occlusion body, and needs to be manually placed by level producers, increasing complexity of level production. Therefore, to implement occlusion determination of the object in the virtual scene as soon as possible, in the method for processing occlusion in an image provided in the foregoing embodiments of this disclosure, a hardware manner (that is, generate the depth map by using the GPU) may be used for generating a predicted depth map corresponding to each predicted viewpoint parameter without an additional occlusion model, so that the drawing speed is fast and processing efficiency can be improved, but this application is not limited thereto.

Figure 10:
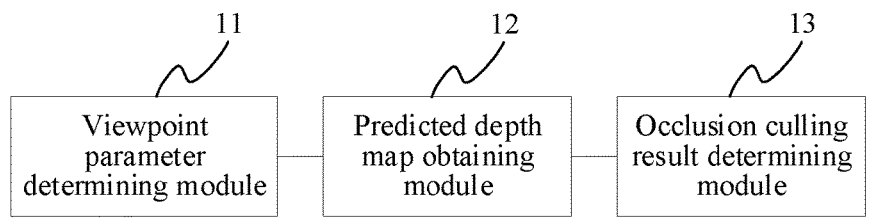
FIG. 10 is a schematic structural diagram of an apparatus for processing occlusion in an image according to an embodiment of this disclosure.

Referring to FIG. 10, FIG. 10 is a schematic structural diagram of an apparatus for processing occlusion in an image according to an embodiment of this disclosure. The apparatus may include but not limited to the following virtual modules:

a viewpoint parameter determining module 11, configured to determine a current viewpoint parameter used for drawing a current frame of image;

a predicted depth map obtaining module 12, configured to obtain a predicted depth map matching the current viewpoint parameter as a target depth map of the current frame of image; and an occlusion culling result determining module 13, configured to perform occlusion culling according to the target depth map, to obtain an occlusion culling result of an object in the current frame of image.

In another embodiment of this disclosure, the apparatus may further include:

a list of to-be-rendered objects obtaining module, configured to obtain a list of to-be-rendered objects of a to-be-rendered virtual scene, the list of to-be-rendered objects including objects in the virtual scene; and a culling module, configured to perform viewing frustum culling on a current frame of image of the virtual scene, to determine an object outside a range of a current viewpoint, and cull the determined object from the list of to-be-rendered objects.

Correspondingly, the occlusion culling result determining module 13 may be configured to determine an occlusion culling result of an object in the range of the current viewpoint in the current frame of image according to the target depth map.

Figure 11:
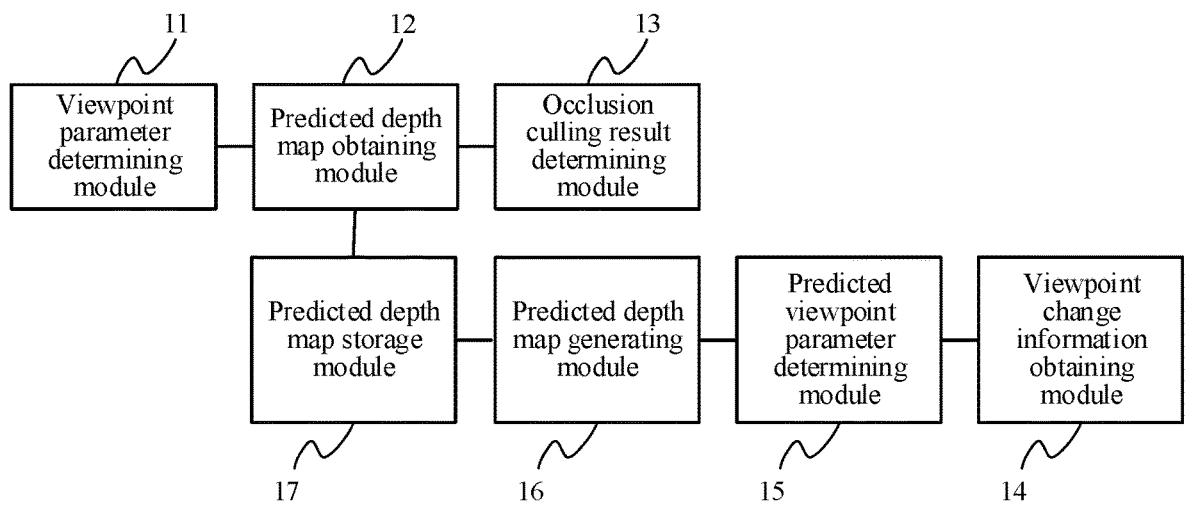
FIG. 11 is a schematic structural diagram of another apparatus for processing occlusion in an image according to an embodiment of this disclosure.

In some embodiments, as shown in FIG. 11, the apparatus may further include:

a change-of-viewpoint information obtaining module 14, configured to obtain change-of-viewpoint information used for drawing each frame of image;

a predicted viewpoint parameter determining module 15, configured to determine each predicted viewpoint parameter used for drawing each future frame of image according to the change-of-viewpoint information, the future frame of image being a frame of image drawn after the current frame of image;

a predicted depth map generating module 16, configured to generate each predicted depth map corresponding to the each determined predicted viewpoint parameter; and a predicted depth map storage module 17, configured to store the each generated predicted depth map.

Correspondingly, the predicted depth map obtaining module 12 may include:

a similarity obtaining unit, configured to obtain each similarity between the current viewpoint parameter and the each predicted viewpoint parameter corresponding to the each stored predicted depth map; and an obtaining unit, configured to determine a predicted depth map corresponding to a predicted viewpoint parameter with a highest similarity as the predicted depth map matching the current viewpoint parameter.

Figure 12:
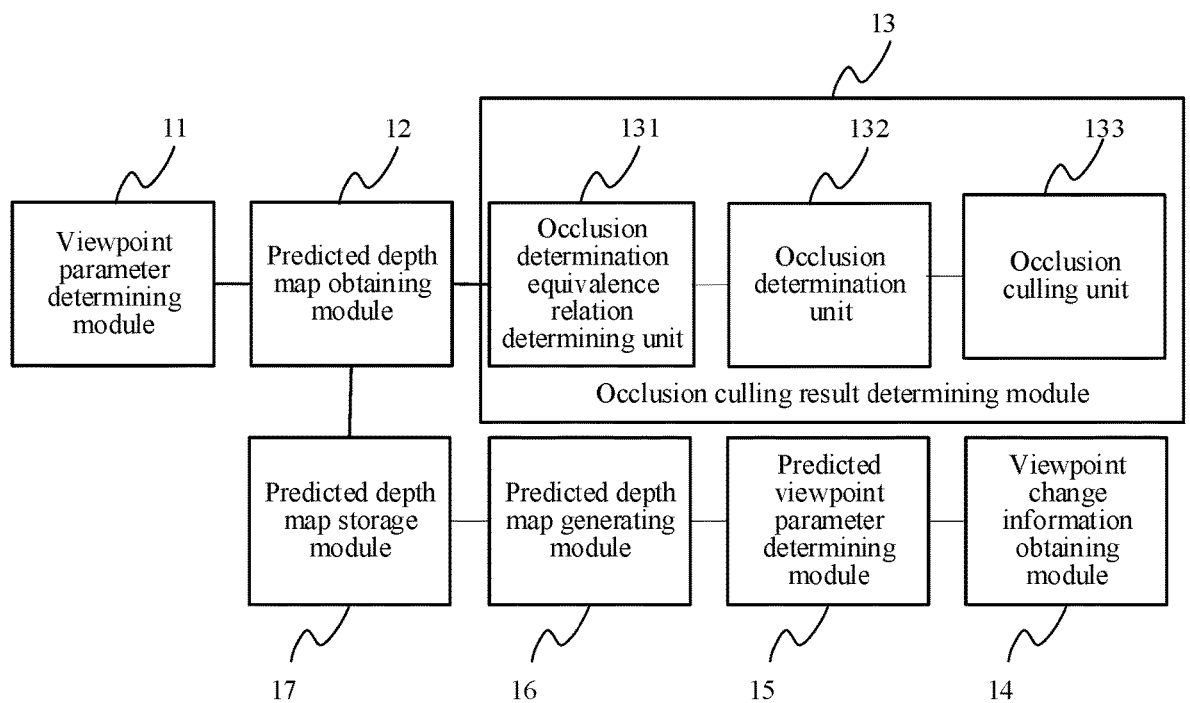
FIG. 12 is a schematic structural diagram of still another apparatus for processing occlusion in an image according to an embodiment of this disclosure.

Based on the foregoing embodiments, as shown in FIG. 12, the occlusion culling result determining module 13 may include:

an occlusion determination equivalence relation determining unit 131, configured to determine a viewpoint parameter corresponding to the target depth map, and determine an occlusion determination equivalence relation of the object in the current frame of image under different viewpoints according to the predicted viewpoint parameter corresponding to the target depth map and the current viewpoint parameter;

an occlusion determination unit 132, configured to determine an occluded object according to the occlusion determination equivalence relation and depth information of the object in the current frame of image in the target depth map; and an occlusion culling unit 133, configured to cull the determined occluded object from a list of to-be-rendered objects.

Based on the foregoing embodiments, the apparatus may further include:

a detection module, configured to detect, during rendering of the current frame of image, whether there is a predicted depth map corresponding to the future frame of image, and trigger, when a detection result is negative, the predicted depth map generating module to generate a predicted depth map corresponding to the determined predicted viewpoint parameter;

a rendering instruction generating module, configured to generate, when the detection result is positive, a rendering instruction for the predicted depth map; and an instruction response module, configured to respond to the rendering instruction when the future frame of image is drawn, to obtain the predicted depth map.

For corresponding functions and technical effects achieved by the virtual modules or units in the foregoing apparatus embodiments, refer to the descriptions of corresponding parts in the foregoing method embodiments. In some embodiments, the apparatus provided in the embodiments of this disclosure may be implemented by using software, and may be the program stored in the memory 22 shown in FIG. 3A and FIG. 3B or software in the form of a plug-in.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The embodiments of this disclosure further provide a computer storage medium, storing a computer program, the computer program being executed by a processor to implement steps of the foregoing method for processing occlusion in an image. For an implementation process of the method for processing occlusion in an image, reference may be made to the description in the foregoing method embodiments.

The embodiments of this disclosure further provide a GPU, configured to perform steps of the foregoing method for processing occlusion in an image. After each frame of image in a to-be-rendered virtual scene is drawn, an occluded object in the each frame of image is quickly and accurately recognized and culled according to a corresponding target depth map selected from pre-stored predicted depth maps, to avoid rendering the occluded object, and improve rendering efficiency.

Although preferable embodiments of this disclosure have been described, once a person skilled in the art know a basic creative concept, other changes and modifications may be made to these embodiments. Therefore, the following claims are intended to be construed as to cover the exemplary embodiments and all changes and modifications falling within the scope of this disclosure.

INDUSTRIAL PRACTICABILITY

In the embodiments of this disclosure, when it is necessary to determine a situation of an occluded object in a current frame of image, after the current frame of image is drawn, a predicted depth map matching a current viewpoint parameter may be directly obtained from pre-stored predicted depth maps as a target depth map of the current frame of image, to quickly and accurately determine an occlusion culling result of an object in the current frame of image according to the target depth map without the need of waiting at a current frame until a depth map under a current viewing frustum is drawn, thereby greatly shortening waiting time of obtaining a depth map corresponding to the current frame of image, and improving occlusion determination efficiency of the object in the image. This manner reduces computing overheads of occlusion culling, and therefore is applicable to a mobile platform with relatively poor computing capabilities.

What is claimed is:

1. A method for processing occlusion in an image, comprising:
   generating at least one candidate depth map comprising at least one candidate predicted depth map corresponding to at least one predicted viewpoint parameter;

determining a current viewpoint parameter used for drawing a current image frame;
obtaining a predicted depth map matching the current viewpoint parameter as a target depth map of the current image frame by selecting one of the at least one candidate depth map whose predicted viewpoint parameter has a highest similarity to the current viewpoint parameter; and
performing occlusion culling according to the target depth map to obtain an occlusion culling result of an object in the current image frame.

2. The method according to claim 1, wherein before obtaining the predicted depth map matching the current viewpoint parameter as the target depth map of the current image frame, the method further comprises:
obtaining change-of-viewpoint information used for drawing at least one future image frame;
determining the at least one predicted viewpoint parameter used for drawing the at least one future image frame according to the change-of-viewpoint information, the at least one future image frame being drawn after the current image frame; and
storing the at least one candidate predicted depth map.

3. The method according to claim 1, further comprising:
obtaining a list of to-be-rendered objects of a to-be-rendered virtual scene, the list of to-be-rendered objects comprising objects in the virtual scene;
performing viewing frustum culling on the current image frame of the virtual scene to determine at least one object outside a range of a current viewpoint; and
culling the at least one object outside the range of the current viewpoint from the list of to-be-rendered objects.

4. The method according to claim 3, wherein performing occlusion culling according to the target depth map to obtain the occlusion culling result of the object in the current image frame comprises:
determining a viewpoint parameter corresponding to the target depth map;
determining an occlusion determination equivalence relation of the object in the current image frame under different viewpoints according to the viewpoint parameter corresponding to the target depth map and the current viewpoint parameter;
determining at least one occluded object according to the occlusion determination equivalence relation and depth information of the object in the current image frame in the target depth map; and
culling the at least one occluded object from the list of to-be-rendered objects.

5. The method according to claim 2, further comprising:
generating, during rendering of the current image frame, one of the at least one candidate predicted depth map corresponding to the predicted viewpoint parameter of the at least one future image frame when determining that there is no predicted depth map corresponding to the at least one future image frame;
generating a rendering instruction for the at least one candidate predicted depth map when determining that there is the at least one candidate predicted depth map corresponding to the at least one future image frame; and
responding to the rendering instruction when drawing the future image frame to obtain the at least one candidate predicted depth map.

6. The method according to claim 1, wherein
determining the current viewpoint parameter used for drawing the current image frame comprises:
invoking a central processing unit (CPU) to determine the current viewpoint parameter used for drawing the current image frame; and
obtaining the predicted depth map matching the current viewpoint parameter as the target depth map of the current image frame comprises:
invoking a graphics processing unit to generate the predicted depth map matching the current viewpoint parameter; and
invoking the CPU to obtain the predicted depth map matching the current viewpoint parameter as the target depth map of the current image frame.

7. An apparatus for processing occlusion in an image, comprising:
a memory storing at least one program;
at least one processor, in communication with the memory and configured to execute the at least one program to perform the steps, comprising:
determining a current viewpoint parameter used for drawing a current image frame;
generating at least one candidate depth map comprising at least one candidate predicted depth map corresponding to at least one predicted viewpoint parameter;
obtaining a predicted depth map matching the current viewpoint parameter as a target depth map of the current image frame by selecting one of the at least one candidate depth map whose predicted viewpoint parameter has a highest similarity to the current viewpoint parameter; and
performing occlusion culling according to the target depth map to obtain an occlusion culling result of an object in the current image frame.

8. The apparatus according to claim 7, wherein before obtaining the predicted depth map matching the current viewpoint parameter as the target depth map of the current image frame, the at least one processor is further configured to perform the steps, comprising:
obtaining change-of-viewpoint information used for drawing at least one future image frames;
determining the at least one predicted viewpoint parameter used for drawing the at least one future image frame according to the change-of-viewpoint information, the at least one future image frame being drawn after the current image frame; and
storing the at least one candidate predicted depth map.

9. The apparatus according to claim 7, wherein the least one processor is further configured to execute the at least one program to perform the steps, comprising:
obtaining a list of to-be-rendered objects of a to-be-rendered virtual scene, the list of to-be-rendered objects comprising objects in the virtual scene;
performing viewing frustum culling on the current image frame of the virtual scene to determine at least one object outside a range of a current viewpoint; and
culling the at least one object outside the range of the current viewpoint from the list of to-be-rendered objects.

10. The apparatus according to claim 9, wherein the at least one processor is configured to perform occlusion culling according to the target depth map to obtain the occlusion culling result of the object in the current image frame by the steps, comprising:
determining a viewpoint parameter corresponding to the target depth map;

determining an occlusion determination equivalence relation of the object in the current image frame under different viewpoints according to the viewpoint parameter corresponding to the target depth map and the current viewpoint parameter;

determining at least one occluded object according to the occlusion determination equivalence relation and depth information of the object in the current image frame in the target depth map; and culling the at least one occluded object from the list of to-be-rendered objects.

11. The apparatus according to claim 8, wherein the least one processor is further configured to execute the at least one program to perform the steps, comprising:

generating, during rendering of the current image frame, one of the at least one candidate predicted depth map corresponding to the predicted viewpoint parameter of the at least one future image frame when determining that there is no predicted depth map corresponding to the at least one future image frame;

generating a rendering instruction for the at least one candidate predicted depth map when determining that there is the at least one candidate predicted depth map corresponding to the at least one future image frame; and responding to the rendering instruction when drawing the future image frame to obtain the at least one candidate predicted depth map.

12. The apparatus according to claim 7, wherein the at least one processor comprises a central processing unit (CPU) and a graphics processing unit (GPU) in communication with each other, the at least one processor is further configured to determine the current viewpoint parameter used for drawing the current image frame by the steps comprising:

invoking the CPU to determine the current viewpoint parameter used for drawing the current image frame; and the at least one process is further configured to obtain the predicted depth map matching the current viewpoint parameter as the target depth map of the current image frame by the steps, comprising:

invoking the GPU to generate the predicted depth map matching the current viewpoint parameter; and invoking the CPU to obtain the predicted depth map matching the current viewpoint parameter as the target depth map of the current image frame.

13. A non-transitory computer storage medium, storing at least one computer program, the at least one computer program, when executed, causing an apparatus to perform the steps, comprising:

determining a current viewpoint parameter used for drawing a current image frame;

generating at least one candidate depth map comprising at least one candidate predicted depth map corresponding to at least one predicted viewpoint parameter;

obtaining a predicted depth map matching the current viewpoint parameter as a target depth map of the current image frame by selecting one of the at least one candidate depth map whose predicted viewpoint parameter has a highest similarity to the current viewpoint parameter; and performing occlusion culling according to the target depth map to obtain an occlusion culling result of an object in the current image frame.

14. The non-transitory computer storage medium of claim 13, wherein before performing the step of obtaining the predicted depth map matching the current viewpoint parameter as the target depth map of the current image frame, the at least one computer program, when executed, further causes the apparatus to perform the steps, comprising:

obtaining change-of-viewpoint information used for drawing at least one future image frame;

determining the at least one predicted viewpoint parameter used for drawing the at least one future image frame according to the change-of-viewpoint information, the at least one future image frame being drawn after the current image frame; and storing the at least one candidate predicted depth map.

15. The non-transitory computer storage medium of claim 14, wherein the at least one computer program, when executed, further causes the apparatus to perform the steps, comprising:

generating, during rendering of the current image frame, one of the at least one candidate predicted depth map corresponding to the predicted viewpoint parameter of the at least one future image frame when determining that there is no predicted depth map corresponding to the at least one future image frame;

generating a rendering instruction for the at least one candidate predicted depth map when determining that there is the at least one candidate predicted depth map corresponding to the at least one future image frame; and responding to the rendering instruction when drawing the future image frame to obtain the at least one candidate predicted depth map.

16. The non-transitory computer storage medium of claim 13, wherein the at least one computer program, when executed, further causes the apparatus to perform the steps, comprising:

obtaining a list of to-be-rendered objects of a to-be-rendered virtual scene, the list of to-be-rendered objects comprising objects in the virtual scene;

performing viewing frustum culling on the current image frame of the virtual scene to determine at least one object outside a range of a current viewpoint; and culling the at least one object outside the range of the current viewpoint from the list of to-be-rendered objects.

17. The non-transitory computer storage medium of claim 16, wherein performing occlusion culling according to the target depth map to obtain the occlusion culling result of the object in the current image frame comprises:

determining a viewpoint parameter corresponding to the target depth map;

determining an occlusion determination equivalence relation of the object in the current image frame under different viewpoints according to the viewpoint parameter corresponding to the target depth map and the current viewpoint parameter;

determining at least one occluded object according to the occlusion determination equivalence relation and depth information of the object in the current image frame in the target depth map; and culling the at least one occluded object from the list of to-be-rendered objects.

18. The non-transitory computer storage medium of claim 13, wherein determining the current viewpoint parameter used for drawing the current image frame comprises:

invoking a central processing unit (CPU) to determine the current viewpoint parameter used for drawing the current image frame; and obtaining the predicted depth map matching the current viewpoint parameter as the target depth map of the current image frame comprises:
   invoking a graphics processing unit to generate the predicted depth map matching the current viewpoint parameter; and
   invoking the CPU to obtain the predicted depth map matching the current viewpoint parameter as the target depth map of the current image frame.

19. The method of claim 1, wherein the at least one candidate depth map is generated when an operation for drawing a preceding image frame is performed.

20. The apparatus of claim 7, wherein the at least one candidate depth map is generated when an operation for drawing a preceding image frame is performed.

* * * * *